Nov. 27, 1956     R. N. BURLESON     2,771,723

RADIUS GRINDING FIXTURE

Filed Dec. 2, 1954     2 Sheets-Sheet 1

INVENTOR
ROBERT N. BURLESON
BY
*Moore & Graham*
ATTORNEYS

Nov. 27, 1956 R. N. BURLESON 2,771,723
RADIUS GRINDING FIXTURE
Filed Dec. 2, 1954 2 Sheets-Sheet 2

INVENTOR.
ROBERT N. BURLESON
BY
*Mason & Graham*
ATTORNEYS

United States Patent Office 2,771,723
Patented Nov. 27, 1956

2,771,723

RADIUS GRINDING FIXTURE

Robert N. Burleson, Culver City, Calif.

Application December 2, 1954, Serial No. 472,696

2 Claims. (Cl. 51—225)

This invention has to do with devices to facilitate the grinding of a radius on a tool, such as a cutter wheel or the like.

I am aware that cutter grinders are often provided with means for performing a radius grinding operation on a cutter wheel or other tool; however, such means is usually a heavy and permanent part of the machine. So far as I know, these are no practical lightweight fixtures suitable for attachment to cutter grinders and other machines for performing a radius grinding operation.

It therefore is an object of my invention to provide a simple, relatively lightweight cutter holder fixture or attachment for use in grinding a radius on a rotary cutter or other tool which can be readily attached to a cutter grinder, and to other types of machines and quickly set up for performing a given operation.

Another object is to provide such a fixture which can be manufactured at relatively low cost.

These and other objects will be apparent from the drawing and the following description.

Referring to the drawings.

Figure 1:
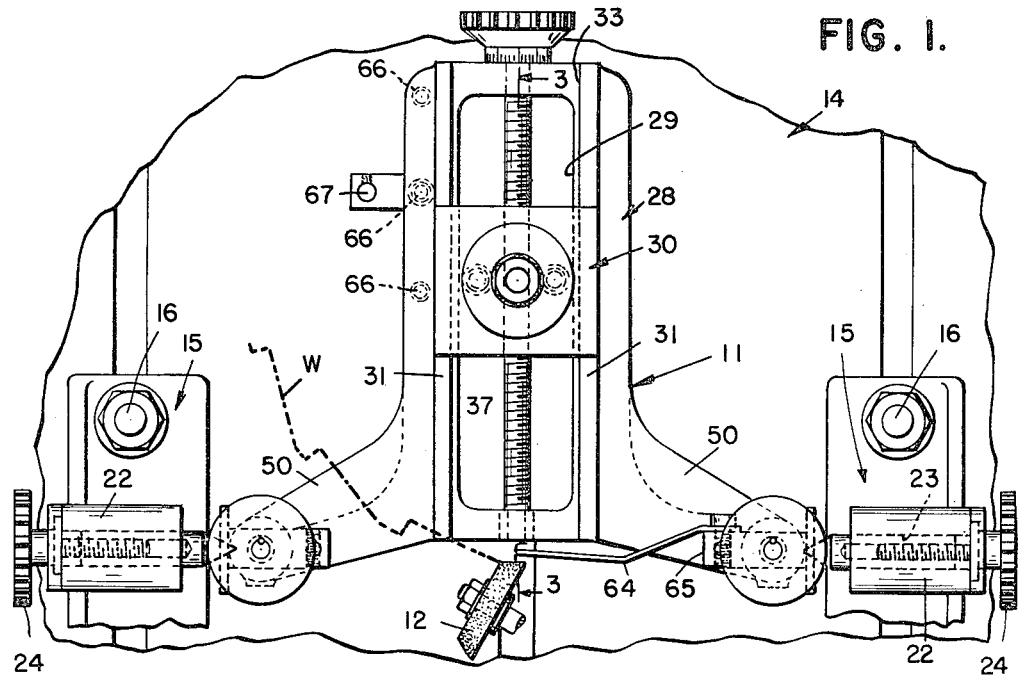
Fig. 1 is a plan view of a fixture embodying the invention shown as it would appear mounted on a cutter grinder or other tool.

More particularly describing the invention, the cutter holding fixture, generally designated by 11, is shown in conjunction with a cutter grinder, the abrasive wheel 12 of which is shown in the drawings. 14 designates the table of the cutter grinder or other machine capable of performing a grinding operation. A pair of posts, indicated generally by 15, are shown mounted upon the table by T-bolts 16. The posts each provide a "center" or pivot point in the form of the conventional conically pointed pin 18. The pins 18 are shown as longitudinally adjustable in the upper end portions 22 of the posts, being received in a bore 23 therein and being internally threaded to receive an adjustment screw 24.

Figure 3:
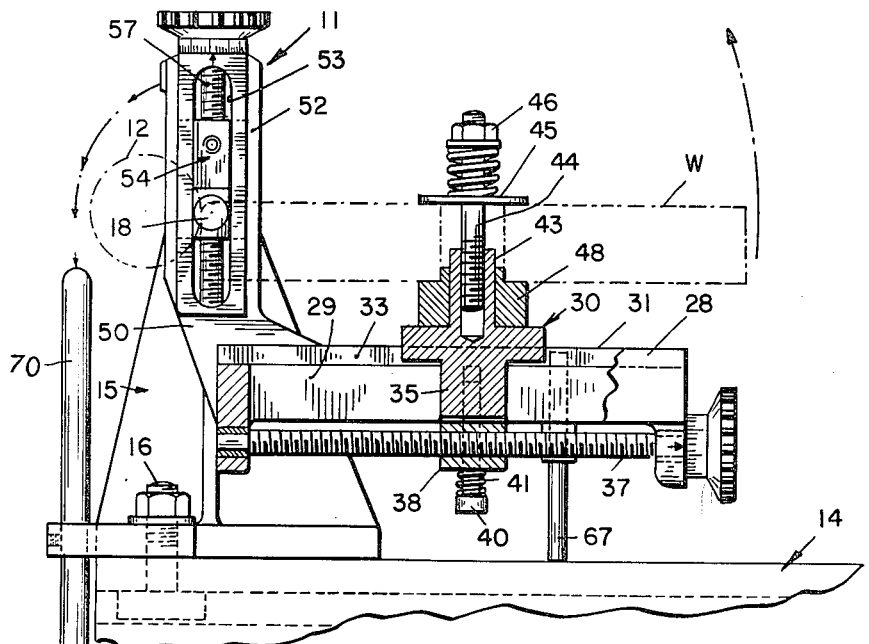
Fig. 3 is a sectional view on line 3—3 of Fig. 1.
Figure 4:
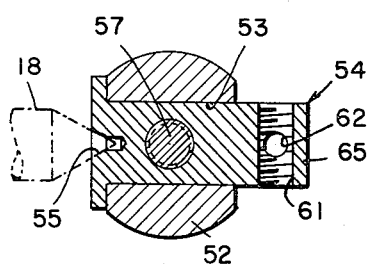
Fig. 4 is an enlarged sectional view on line 4—4 of Fig. 2.

As will later appear, the fixture 11 is supported upon and between the centers 18 for swinging movement about an axis passing through the centers. The fixture includes an elongated body 28 which is shown as having a slot 29 therein. The body 28 carries a work or cutter support 30 which is movable upon a guideway formed partly by the slot 29 and further by parallel lands 31 and inner shoulders 33 adjacent thereto. Member 30 is shaped to extend over the lands and fit slidably between the shoulders 33. The work support 30 also includes a depending portion 35 which is freely received in the slot 29. In order to provide for adjusted positioning of the support, I mount a micrometer screw 37 of conventional construction in the body as best shown in Fig. 3. On the screw is a nut or threaded block 38 which is attached to member 30 by two screws 40. Part 38 is resiliently pressed against the under surface of the body 28 by springs 41 between the heads of the screws and the part.

The upper portion of member 30 is formed to provide an upright cylindrical section 43 which is internally threaded to receive a stud 44. The latter, in conjunction with a washer 45 and nut 46, is used to secure the work W, shown as a cutter wheel. A tool-mounting collar 48 is shown on the support, and it will be recognized that interchangeable collars may be used, or the collar dispensed with, as required by the dimensions of the work.

A pair of arms 50 extend laterally, forwardly and upwardly from the forward end of the body. At the end of each arm is an upright post 52. This latter is slotted at 53 to slidably receive a block 54 having one or more recesses 55 to receive a center. The posts are each provided with a micrometer-type adjustment screw, generally indicated by 57 and this passes through the block 54 being threadedly mounted therein to effect adjustment of the block.

Figure 2:
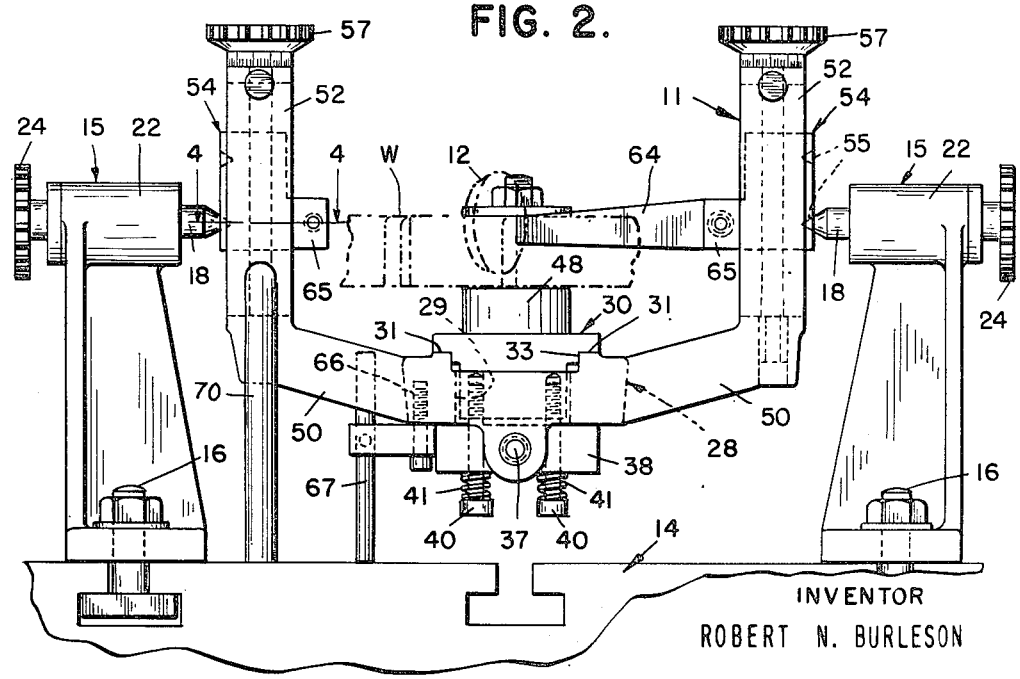
Fig. 2 is an elevational view of the device of Fig. 1.

Each of the blocks is provided with an inwardly extending projection 65 which has threaded bores 61 and 62 for the purpose of mounting a guide rod, stop finger or the like, such as the stop member 64 shown in Figs. 1 and 2.

The body 28 may be provided with several tapped holes 66 on its under surface for the purpose of mounting guide or stop pins, such as the stop pin 67 upon which the device is shown resting in the drawing.

Figures 5, 6:
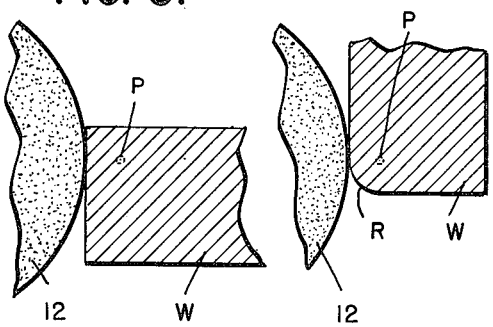
Figs. 5 and 6 are fragmentary sectional views of an edge portion of a tool showing its relation to the grinding wheel during a radius grinding operation.

In use, the fixture or attachment is mounted between the centers or pivotal points 18, and, depending upon the size of the cutter to be ground and the type of radius to be ground thereon, the blocks 54 are adjusted longitudinally of the posts so that the body and the carried cutter will be at the proper elevation with respect to the axis passing through the centers 18. The cutter or other tool to be ground is mounted upon the member 30 and brought into correct relation with the pivotal axis by means of the adjustment screw 37. Assuming a small radius is to be ground upon the edge of each tooth of the cutter or work W shown in the drawing, the fixture is adjusted so as to cause the cutter tooth to be positioned with relation to the grinding wheel 12 as best shown in Figs. 1 and 5. The fixture as a whole is then gradually swung upwardly from the position of Fig. 5 to that of Fig. 6, the radius R being ground in the process. The pivotal axis of the device and of the work is indicated by the letter P in Figs. 5 and 6.

Figure 7:
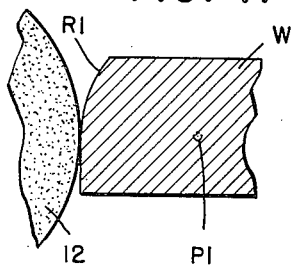
Fig. 7 is a fragmentary sectional view of the edge portion of a tool showing its relation to the grinding wheel for performing a different radius grinding operation.

Fig. 7 is illustrative of a different type of radius grinding operation wherein the work W is so mounted that it pivots about the point P1 for the purpose of grinding the surface R1. A post 70 may be provided on the table 14 for limiting pivotal movement of the device.

Although I have illustrated and described a preferred form of my invention, I contemplate that various changes and modifications can be made therein without departing from the invention, the scope of which is indicated by the following claims.

I claim:

1. A cutter holder fixture adapted to be mounted between centers on a grinding machine or the like for use in grinding a radius on a rotary cutter or other work, comprising an elongated body having a longitudinally extending guideway including a slot through said body, a work support mounted on said guideway for adjusted positioning therealong and projecting through said slot, screw means carried by said body and engageable with said work support below said slot for accurately adjustably positioning said work support along said guideway, a pair of arms at the forward end of said body projecting laterally from opposite side edges thereof, a vertical post extending normal to the general plane of said body carried at the end of each arm, said posts being parallel and longitudinally slotted, a center-receiving block slidably mounted on the slot of each post, screw adjustment means extending longitudinally of each post and including a screw threaded in each block for adjustably positioning the same vertically of the post.

2. A fixture as set forth in claim 1 in which said arms extend divergingly forward and upward of said body whereby said posts are disposed forwardly substantially above said body.

References Cited in the file of this patent

UNITED STATES PATENTS

| | | |
|---|---|---|
| 354,690 | Cleary | Dec. 21, 1886 |
| 1,987,832 | Knight | Jan. 15, 1935 |
| 2,396,281 | Noble et al. | Mar. 12, 1946 |

FOREIGN PATENTS

| | | |
|---|---|---|
| 126,293 | Sweden | Sept. 27, 1949 |